United States Patent [19]

DeGasperis

[11] Patent Number: 5,419,002
[45] Date of Patent: May 30, 1995

[54] DIPSTICK WIPER

[76] Inventor: Ron M. DeGasperis, 14 National Rd., Wheeling, W. Va. 26003

[21] Appl. No.: 267,228

[22] Filed: Jul. 5, 1994

[51] Int. Cl.⁶ .......................................... A47L 25/00
[52] U.S. Cl. .................................................. 15/220.4
[58] Field of Search .................... 15/104.8, 218, 218.1, 15/220.4, 221, 245

[56] References Cited

U.S. PATENT DOCUMENTS

| | | | |
|---|---|---|---|
| 1,719,037 | 7/1929 | Wolf | 15/220.4 |
| 1,839,026 | 12/1931 | Gray et al. | 15/220.4 |
| 2,244,579 | 6/1941 | Scott | 15/220.4 |
| 2,279,111 | 4/1942 | DeWitt | 15/220.4 |
| 2,439,171 | 4/1948 | Kreider | 15/220.4 |
| 2,453,452 | 11/1948 | Nielsen | 15/220.4 |
| 2,529,285 | 11/1950 | Felton | 15/220.4 |
| 2,634,445 | 4/1953 | Clark | 15/220.4 |
| 3,360,819 | 1/1968 | Bruns | 15/220.4 |
| 3,460,181 | 8/1969 | Denver | 15/220.4 |
| 3,703,038 | 11/1972 | Smith . | |
| 4,422,204 | 12/1983 | Long, Jr. | 15/220.4 |
| 4,506,402 | 3/1985 | Long, Jr. | 15/220.4 |
| 4,558,520 | 12/1985 | Forde, Jr. . | |
| 4,896,393 | 1/1990 | Avila, Jr. | 15/220.4 |
| 5,099,584 | 3/1992 | Williams | 33/725 |

FOREIGN PATENT DOCUMENTS

| | | | |
|---|---|---|---|
| 532889 | 11/1956 | Canada | 15/220.4 |
| 1444776 | 5/1966 | France | 15/220.4 |
| 427417 | 4/1935 | United Kingdom | 15/220.4 |
| 689384 | 3/1953 | United Kingdom | 15/220.4 |

*Primary Examiner*—Mark Spisich
*Attorney, Agent, or Firm*—Richard C. Litman

[57] ABSTRACT

An assembly for use in manually wiping a dipstick is provided with a wiper, a chamber having an absorbent material therein, and a well intermediate the wiper and the chamber. Upon dragging a dipstick through the wiper, liquid wiped off the dipstick drains into the well and then into the chamber. Liquid entering the chamber is absorbed by the absorbent material. The assembly is attachable to a stationary structure in the proximity of the dipstick to permit a dipstick to be wiped single handedly. Moreover, a cap may be engageable with the cover to protect the wiper when not in use. The cap may interact with the hood of a motor vehicle so as to remove the cap from the upon raising the hood and return the cap back onto the cover upon closing the hood.

19 Claims, 2 Drawing Sheets

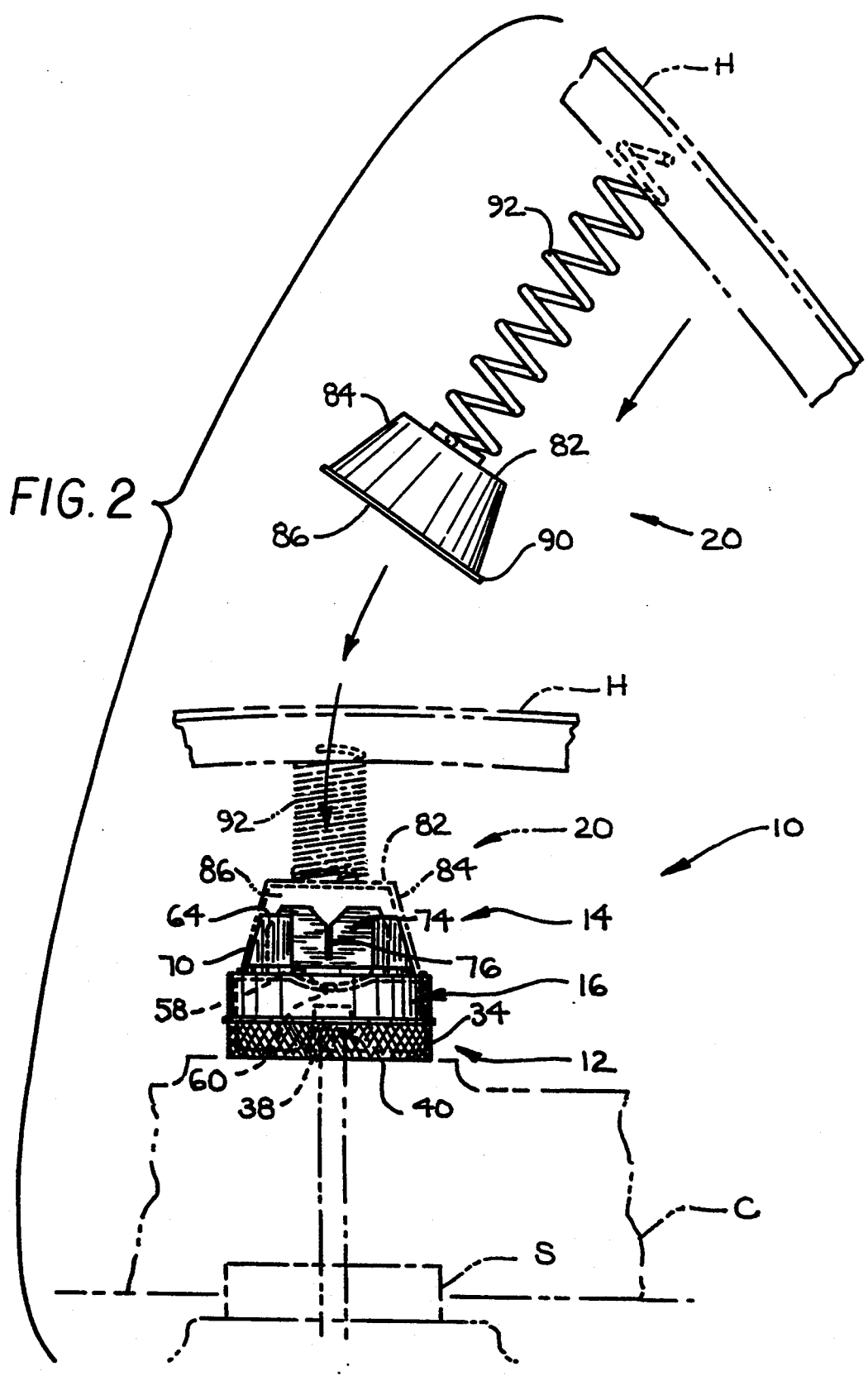

DIPSTICK WIPER

BACKGROUND OF THE INVENTION

1. Field of the Invention

The present invention relates to a wiping implement and more particularly, to an assembly for use in manually wiping liquid off a dipstick.

2. Description of the Prior Art

Dipstick wipers are the subject of earlier patents. For example, U.S. Pat. No. 2,279,111, issued Apr. 7, 1942 to Myrtle A. DeWitt, discloses a dipstick wiper including a sleeve having a bore therein through which a dipstick passes, and a pair of opposed spring fingers projecting from the bore and engaging the dipstick. It should be noted that the wiper is carried by the dipstick and that no provision is disclosed for absorbing oil.

A dipstick cleaner described in U.S. Pat. No. 2,453,452, issued Nov. 9, 1948 to Kenneth Nielsen, includes a cylindrical tube having longitudinally disposed slots therein and two strips of spring steel therein. The strips are covered with an absorbent material. The absorbent material will become saturated over use of the cleaner and no provision is disclosed for replacing the material.

U.S. Pat. No. 3,460,181, issued Aug. 12, 1969 to William J. Denver, discloses a dipstick guide and wiper including a guide tube having apertures formed therein and a pliant wiper element associated with the apertured portion of the guide tube. The wiper element is adapted to be squeezed into the interior of the tube against the dipstick, wiping the dipstick clean. The guide tube may be an integral part of the invention or may extend from an existing crankcase guide tube.

A self-wiping dipstick is disclosed in U.S. Pat. No. 4,558,520, issued Dec. 17, 1985 to George S. Forde, Jr. The dipstick includes an elongated rod-like element having a wiping block slidable along the elongated element. The wiping block is a solid block of oil-resistant and heat-resistant synthetic resin. A dipstick guide tube is received by the lower end of the wiping block. As the elongated element is removed completely from the wiping block, the elongated element is wiped clean of oil and oil removed from the elongated element flows back into the crankcase.

U.S. Pat. No. 4,896,393, issued Jan. 30, 1990 to Hector M. Avila, Jr., discloses a dipstick wiper with a built-in oil detainer. The wiper includes rubber wiper blades which abut each other along blade surfaces to define therebetween an area which wipes a dipstick. Oil wiped off the dipstick is detained in a channel until the wiper is returned to a storage container where oil in the channel drains into the storage container.

None of the aforementioned patents disclose dipstick wipers which may be operated single handedly. A combination oil dipstick and wiper which may be operated single handedly is described in U.S. Pat. No. 3,703,038, issued Nov. 21, 1972 to Carroll G. Smith. This wiper comprises a wiper closure assembly housing including a cylindrical body having resilient annular wiper rings compressed therein so as to urge against a dipstick passing therethrough. As the dipstick is removed from the housing, fluids tend to be wiped clean from the dipstick by the rings.

A self-wiping dipstick is disclosed in U.S. Pat. No. 5,099,584, issued Mar. 31, 1992 to John H. Williams. A dipstick is pivotally suspended from a cap. The cap may be loosened from a wiper plug, which remains stationary in the crankcase tube as the dipstick is withdrawn through it. A series of internal wipers clean the dipstick as it passes through the wiper plug. The clean dipstick may be reinserted into the wiper plug and the cap retightened on the wiper plug. The cap, dipstick, and wiper then may be withdrawn altogether.

None of the above inventions and patents, taken either singly or in combination, is seen to describe the instant invention as claimed.

SUMMARY OF THE INVENTION

The invention described to us is understood to relate to an assembly for use in manually wiping liquid off a dipstick. The assembly includes a base and a cover engaging the base to form a chamber. Absorbent material is disposed in the chamber. The cover includes a structure for supporting a wiper. The wiper has a slot therein. Below the wiper is a well having an opening therein which communicates with the chamber. Upon dragging a dipstick through the slot, oil wiped off the dipstick drains into the well and on through the hole into the chamber where it is absorbed by the absorbent material. The base is releasably attached to a stationary structure in the proximity of the dipstick, enabling the dipstick to be wiped single handedly. A cap is engageable with the cover to protect the wiper when not in use. The cap may interact with the hood of a motor vehicle, whereby upon raising the hood, the cap is removed from the cover and upon lowering the hood, the cap engages the cover.

Accordingly, it is a principal object of the invention to provide an assembly for use in single-handedly wiping a dipstick; this is a particular benefit for users having a disabled limb.

It is another object that the assembly be provided with an absorbent material capable of absorbing liquid wiped off the dipstick. It should be noted that the absorbent material may be replaceable, such as by separating the cover from the base to provide access to the chamber.

It is a further object that the assembly be releasably attachable to a stationary structure, preferably in the proximity of the dipstick. Slippage between the cover and the base limits the torque applied in attaching the assembly to a stationary structure. It should be noted that the assembly may further be utilized as a fastener for fastening an item, such as the air filter cover, in place.

Still another object is that the assembly be provided with a wiping element and further that the wiping element be protected by a cap or the like when not in use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is an environmental side elevational view of the dipstick wiper, as shown in FIG. 1, and further showing a motor vehicle hood, carburetor and stud, and an air cleaner in phantom lines.

Similar reference characters denote corresponding features consistently throughout the attached drawings.

DETAILED DESCRIPTION OF THE PREFERRED EMBODIMENT

Figure 1:
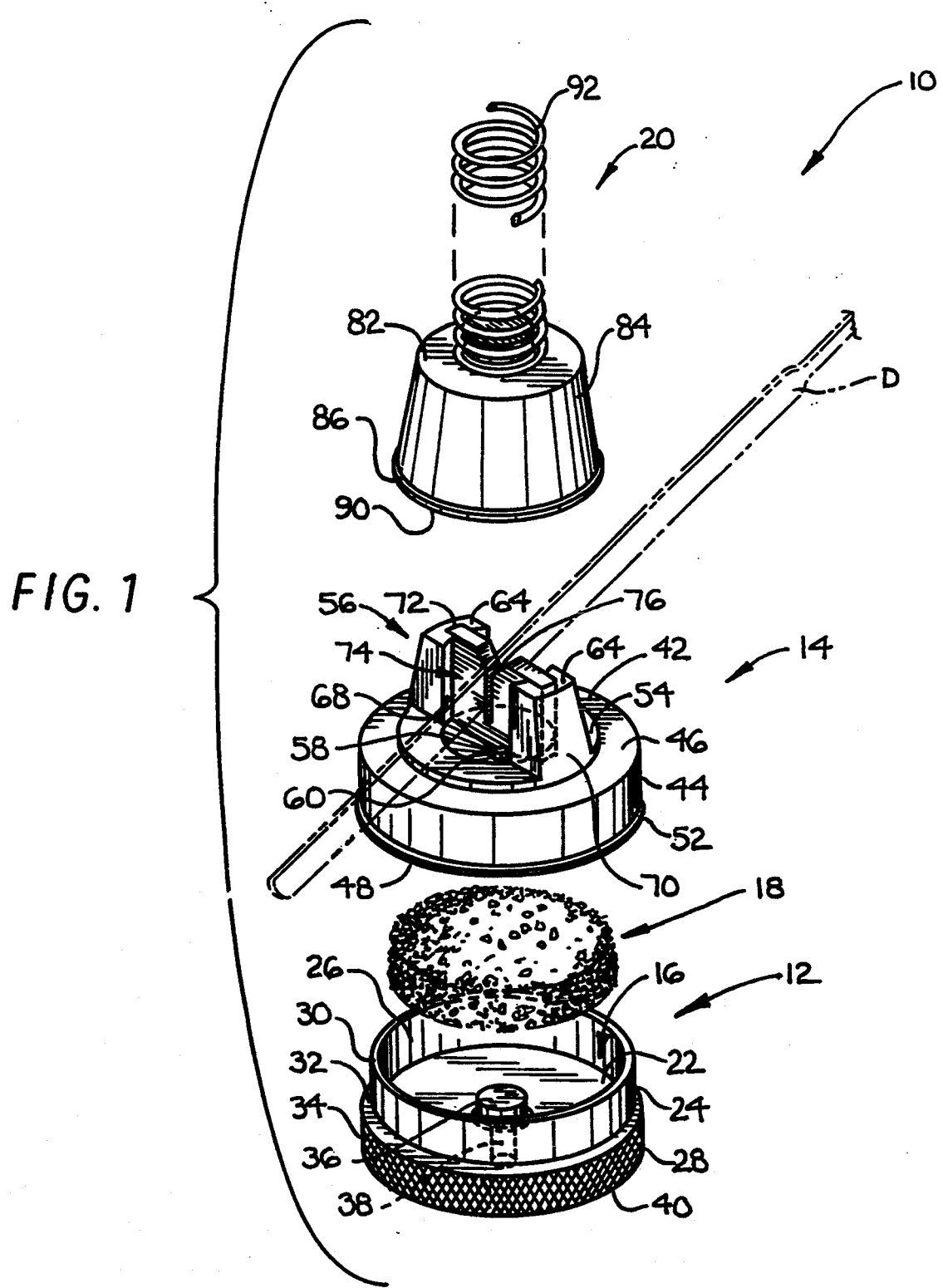
FIG. 1 is an exploded environmental perspective view of a dipstick wiper assembly according to the present invention, and showing a dipstick in phantom lines.

The present invention, as shown in FIG. 1, is a dipstick wiper assembly 10 for use in manually wiping a dipstick D. The assembly 10 basically comprises a housing including a base 12 and a cover 14, matingly engageable with the base 12 so as to form a chamber 16, and a sorbent material 18 contained within the chamber 16. A cap 20 may be provided to protect the cover 14 when not in use.

The base 12 includes a first or bottom wall 22, which is shown to be substantially planar and circumferential in shape, and a second or peripheral wall 24 which is shown to be cylindrical in shape. The peripheral wall 24 is integral with the bottom wall 22 and preferably joined at a right angle to the bottom wall 22 so as to define an interior cavity 26. The peripheral wall 24 includes a lower portion 28, proximate the bottom wall 22, and an upper, reduced diameter portion 30 separated from portion 28 by a medial shoulder 32. The lower portion 28 of the peripheral wall 24 is shown to include a knurled outer surface 34 for reason to be disclosed herebelow. The bottom wall 22 is provided with an upwardly or inwardly projecting, centrally disposed protrusion 36. An aperture 38 originates in an underside 40 of the bottom wall 22 and penetrates upwardly and axially a predetermined distance into the protrusion 36. The aperture 38 is provided with an internal thread which permits the assembly 10 to be threadably attached to a stationary structure S in the proximity of the dipstick D. The knurled outer surface 34 enhances the user's grip when affixing the assembly 10 to the stationary structure S.

The cavity bounded by the base is provided to contain an sorbent material and, preferably, a universal liquid sorbent material for absorbing oil and petroleum based liquids, such as but not limited to POWERSORB manufactured by 3M of Minnesota, or a clay granule material. Alternatively, suitable fibrous absorbent materials may be employed.

The cover 14 includes a first, or upper wall 42, and a second, or peripheral wall 44. The upper wall 42, as illustrated, comprises a substantially planar and circumferential portion 46. The peripheral wall 44 is shown to be substantially cylindrical in shape. The peripheral wall 44 is integral with the upper wall 42 and preferably joined perpendicularly to the upper wall 42 so as to define an interior cavity 48. The peripheral wall 44 includes a lower portion, distal from the upper wall 42, provided with a peripheral flange 52 which upon adjoining the cover 20 and the base 12, abuts the medial shoulder 32 of the base 12.

The upper wall 42 is provided with a centrally disposed raised surface area 54 having an upwardly or outwardly projecting, centrally disposed support structure 56 extending therefrom. The raised surface area 54 further has a concentrically disposed concave well 58 therein. A bore 60 is located at a first or lower end of the well 58. The bore 60 passes completely through the upper wall 42 so as to communicate with the interior cavity 48 defined by the upper and peripheral walls 42 and 44. The support structure 56 includes a pair of oppositely disposed or spaced apart towers 64 separated by the well 58 located therebelow. The towers 64 have facing surfaces or opposed surfaces 68, and outer surfaces 70. The opposed surfaces 68 have opposed guides, or guide channels 72 therein, for receiving a wiper element 74. The outer surfaces 70 are sloping or tapered surfaces possessing a substantially curved facade. The interior cavity 48 of the cover 14 is dimensioned and configured to snugly receive the reduced diameter portion 30 of the peripheral wall 24 of the base 12, thus forming the closed chamber 16, retaining the sorbent material 18 therein. More specifically, the outer surface of the reduced diameter portion 30 of the peripheral wall 24 of the base 12 fits snugly within the cover 14, frictionally engaging the inner surface of the peripheral wall 44 of the cover 14.

The wiper element 74 received by the guide channels 72 is a substantially planar element, preferably fabricated of the pliable, oil resistant synthetic resin or material, such as rubber. The wiper element 74 has a predetermined thickness such that element 74 fits tightly within the guide channels 72 and is dimensioned to extend substantially from the well 58 to a point flush with the upper surfaces of the towers 64. A slot 76 is arranged intermediately of the wiper element 74 and originates at the top edge of the wiper element 74, extending in a first direction, or downwardly, terminating a predetermined distance from the bottom edge of the wiper element 74.

In use, and more particularly, when in use with a motor vehicle (not shown), the assembly 10 is affixed to a stationary structure S in the engine compartment of the motor vehicle. In this way, the dipstick D may be wiped single-handedly. This makes the invention very easy to use for checking the oil level in an engine. For persons having a disabled limb, the invention is equally easy to use.

It should be noted that the assembly 10 may be substituted as, or used in place of, the retaining nut or fastener for the air filter cover C, as is shown in FIG. 2. In this location, the assembly 10 is readily accessible by the user (not shown). To wipe the dipstick D, the user simply inserts the dipstick D in the slot 76 in the wiper element 74 and pulls the dipstick D through the slot 74. As the dipstick D is pulled through the slot 74, oil cleaned off the dipstick D drains into the well 58 and on into the chamber 16 where it is absorbed and retained by the sorbent material 18.

The cap 20 includes a first wall, or an upper wall 82, and a second or peripheral wall 84. The upper wall 82, as shown in the drawings, is substantially planar and circumferential in shape. The peripheral wall 84 is shown to be substantially frustoconical. The peripheral wall 84 is integral with the upper wall 82 so as to define an interior cavity 86. The peripheral wall 84 includes a lower portion, distal from the upper wall 82, provided with a peripheral flange 90 which, upon adjoining the cap 20 and the cover 14, abuts the planar, circumferential portion 46 of the cover 14. The cap 20 and the cover 14 are configured to cooperatively engage one another. That is to say, the conical shape of the cap 20 and the complementary curved facade and sloping outer surfaces 70 of the towers 64 are cooperatively configured to ensure proper seating of the cap 20 and cover 14. This is especially advantageous when the assembly 10 is mounted in the hood compartment of the motor vehicle in close proximity to the hood H, such as in the place of the air filter cover retaining nut, as will become clear forthwith and with reference to FIG. 2. The upper wall 82 of the cap 20 has a coiled spring 92 extending therefrom. The coiled spring 92 may be adjoined to an underside of the motor vehicle hood H in vertical alignment with the wiper assembly 10. The length of the coil spring 92 enables the same to become slightly compressed between the cover 14 and the hood H when the cap 20 is on the cover 14 and the hood H is in a closed position. Upon opening the hood H, the cap 20 is removed to expose the wiper element 74 for use. Upon closing the hood H, the cap 20 returns to a seated position on the cover 14, protecting the wiper element 74 from foreign particles and contaminants. It should be noted that the spring 92 permits movement of the cap 20 and wiper assembly 10 relative to the hood H during vibration and rocking of the motor vehicle engine (not shown), without dislodging the cap from its position on cover 14.

Locating a position on the underside of the motor vehicle hood H for attaching the spring 92 is simple. Merely apply a telltale material, such as chalk, rouge, or the like, to the end of the spring 92 distal from the cap 20, place the cap 20 on the cover 14, and close the hood H. Upon closing the hood H, the telltale material will mark the location where the distal end of the spring 92 contacts the underside of the hood H, namely, the hood insulation. At this juncture, the distal end of the coiled spring may be affixed to the hood H or hood insulation. Now, upon closing the hood H, the cap 20 will align with the cover 12, returning to a seated position.

It is to be understood that the present invention is not limited to the sole embodiment described above, but encompasses any and all embodiments within the scope of the following claims.

I claim:
1. A dipstick wiper assembly comprising:
   a housing defining a chamber and an opening, said opening communicating with said chamber;
   said chamber having sorbent material therein;
   a wiper supported atop said housing; and
   a cap engageable with said housing to cover said wiper, said cap having a spring connection extending therefrom for securing said cap in proximity to said wiper.
2. The assembly according to claim 1, wherein said housing includes a base and a cover engageable with said base, thus to define said chamber therebetween.
3. The assembly according to claim 1, wherein said housing has an upper surface, said upper surface including a well and a drain opening formed through said well, said opening thus communicating with said well and said chamber.
4. The assembly according to claim 1, wherein said housing includes means defining an aperture therein, said aperture having internal screw threading.
5. The assembly according to claim 1, further including a support structure atop said housing, said support structure including a pair of spaced towers, said towers having opposed surfaces, said surfaces having guides therein, said wiper being engageable with said guides.
6. The assembly according to claim 1, wherein said sorbent material is a granular oil and petroleum liquid sorbent material.
7. The assembly according to claim 1, wherein said wiper is a substantially planar element having a slot defined therethrough, said slot being dimensioned and configured to tightly receive a dipstick.
8. A dipstick wiper assembly comprising:
   a housing including a base and a cover, said cover being engageable with said base, said base and said cover thus defining a chamber therebetween, said cover including an opening therethrough, said opening communicating with said chamber;
   a sorbent material contained in said chamber;
   a wiper supported atop said housing, said opening in said cover being located intermediate said chamber and said wiper; and
   a cap engageable with said housing to cover said wiper, said cap having a spring extending therefrom for securing said cap in proximity to said wiper.
9. The assembly according to claim 8, wherein said housing has an upper surface, said upper surface including a well, said opening communicating with said well and said chamber.
10. The assembly according to claim 8, wherein said housing includes means defining an aperture therein, said aperture having internal screw threading.
11. The assembly according to claim 8, further including a support structure atop said housing, said support structure including a pair of spaced towers, said towers having opposed surfaces, said surfaces having guides therein, said wiper being engageable with said guides.
12. The assembly according to claim 8, wherein said sorbent material is a granular oil and petroleum liquid sorbent material.
13. The assembly according to claim 8, wherein said wiper is a substantially planar element having a slot defined therethrough, said slot being dimensioned and configured to tightly receive a dipstick.
14. The assembly according to claim 13, wherein said wiper includes a planar element having a top edge, said top edge defining a V-shaped notch, said slot communicating with said V-shaped notch.
15. A dipstick wiper assembly comprising:
   a housing including a base and a cover, said cover being engageable with said base to define a chamber therebetween, said cover having an upper surface, said upper surface defining a well and bounding an opening in said well, said opening communicating with said chamber;
   a sorbent material contained within said chamber;
   a wiper supported by said cover, said wiper being located over said well, said wiper having a wiping slot defined therethrough; and
   a cad engageable with said housing to cover said wiper, said cap having a spring extending therefrom for securing said cap in proximity to said wiper.
16. The assembly according to claim 15, wherein said housing includes means defining an aperture therein, said aperture having internal screw threading.
17. The assembly according to claim 15, further including a support structure atop said housing, said support structure including a pair of spaced towers, said towers having opposed surfaces, said surfaces having guides therein, said wiper being engageable with said guides.
18. The assembly according to claim 15, wherein said wiper further includes a top edge, said top edge defining a notch therein, said slot communicating with said notch, said slot being dimensioned and configured to tightly receive a dipstick.
19. The assembly according to claim 15, wherein said sorbent material is a granular oil and petroleum liquid sorbent material.

* * * * *